US008812568B2

(12) United States Patent
Fukunaga

(10) Patent No.: US 8,812,568 B2
(45) Date of Patent: Aug. 19, 2014

(54) INFORMATION PROCESSING METHOD, INFORMATION PROCESSING DEVICE, PROGRAM, AND RECORDING MEDIUM

(75) Inventor: Hiroomi Fukunaga, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/583,594

(22) PCT Filed: Mar. 11, 2011

(86) PCT No.: PCT/JP2011/055832
§ 371 (c)(1),
(2), (4) Date: Sep. 7, 2012

(87) PCT Pub. No.: WO2011/111837
PCT Pub. Date: Sep. 15, 2011

(65) Prior Publication Data
US 2013/0041928 A1 Feb. 14, 2013

(30) Foreign Application Priority Data
Mar. 11, 2010 (JP) .................................. 2010-055159

(51) Int. Cl.
*G06F 17/30* (2006.01)
(52) U.S. Cl.
CPC ................ *G06F 17/30091* (2013.01)
USPC ...................................................... 707/830
(58) Field of Classification Search
CPC ...................................................... G06F 17/30
See application file for complete search history.

(56) References Cited

U.S. PATENT DOCUMENTS

| | | | |
|---|---|---|---|
| 6,202,136 B1 * | 3/2001 | Wikle et al. .................. | 711/162 |
| 7,412,449 B2 | 8/2008 | Both | |
| 2004/0107204 A1 | 6/2004 | Sakamoto | |
| 2005/0283489 A1 * | 12/2005 | Shiozawa et al. ............. | 707/100 |
| 2007/0112784 A1 * | 5/2007 | Blumenau ....................... | 707/10 |
| 2007/0250521 A1 * | 10/2007 | Kaminski ...................... | 707/101 |
| 2007/0255530 A1 | 11/2007 | Wolff | |

FOREIGN PATENT DOCUMENTS

| | | | |
|---|---|---|---|
| JP | 10-074154 A | | 3/1998 |
| JP | 2000-242538 A | | 9/2000 |
| JP | 2000-357115 A | | 12/2000 |
| JP | 2004-185214 A | | 7/2004 |

(Continued)

OTHER PUBLICATIONS

English-language translation of International Preliminary Report on Patentability for counterpart application PCT/JP2011/055832.

(Continued)

*Primary Examiner* — Hosain Alam
*Assistant Examiner* — Johnese Johnson
(74) *Attorney, Agent, or Firm* — Sughrue Mion, PLLC

(57) ABSTRACT

An identification information acquisition unit acquires identification information for identifying recording information to be recorded or read. A prime number acquisition unit acquires a prime number corresponding to the identification information among prime numbers having the same number of digits. A computation unit computes the sum of all of the digits of the identification information, the sum being the sum of the products obtained by multiplying the values of each digit of the identification information by the difference obtained by subtracting the differences corresponding to the digits from the acquired prime number. A path determination unit determines a path indicating the directory, where the recording information is stored, from the sum. This method can be applied to an NFS (Network File System).

8 Claims, 12 Drawing Sheets

(56) References Cited

FOREIGN PATENT DOCUMENTS

| JP | 2004-193692 A | 7/2004 |
|---|---|---|
| JP | 2007-004604 A | 1/2007 |
| JP | 2007-293855 A | 11/2007 |
| JP | 2008-210318 A | 9/2008 |

OTHER PUBLICATIONS

Japanese Office Action mailed Jul. 31, 2012, issued in corresponding Japanese Patent Application No. 2012-504546.

* cited by examiner

Fig.10

|  | 3 MILLIONS | | 2 MILLIONS | | 1 MILLION | | MOVIE | | BOOK | |
|---|---|---|---|---|---|---|---|---|---|---|
|  | TIME (ms) | MAXIMUM NUMBER OF ITEMS | TIME (ms) | MAXIMUM NUMBER OF ITEMS | TIME (ms) | MAXIMUM NUMBER OF ITEMS | TIME (ms) | MAXIMUM NUMBER OF ITEMS | TIME (ms) | MAXIMUM NUMBER OF ITEMS |
| EMBODIMENT | 15,025 | 78 | 9,809 | 61 | 5,082 | 37 | 106 | 5 | 7,575 | 48 |
| MD5 | 39,669 | 83 | 26,542 | 54 | 13,733 | 34 | 407 | 5 | 19,601 | 49 |

INFORMATION PROCESSING METHOD, INFORMATION PROCESSING DEVICE, PROGRAM, AND RECORDING MEDIUM

CROSS REFERENCE TO RELATED APPLICATIONS

This application is a National Stage of International Application No. PCT/JP2011/055832 filed Mar. 11, 2011, claiming priority based on Japanese Patent Application No. 2010-055159 filed Mar. 11, 2010, the contents of all of which are incorporated herein by reference in their entirety.

TECHNICAL FIELD

The present invention relates to an information processing method, an information processing device, a program, and a recording medium.

BACKGROUND ART

NFS (Network File System), which is a distributed file system and protocols defined in RFC (Request for Comments) 3530 and the like by IETF (Internet Engineering Task Force), is widely used. The distributed file system is a network file system where a single file system is physically distributed in a plurality of computer nodes, and use of the NFS makes it possible to store a file into a storage device distributed over a network and refer to a file of the storage device. To use a storage device distributed over a network, a technique of managing a file storage area is required. The following patent literatures are disclosed as a technique of managing a file storage area.

Patent Literature 1 discloses that there are included a table that stores the names of all files which exist in one directory with a full path and further stores information about the storage areas of the respective files in a storage device in association with the file names, and a search means that, when an input file name has a full path, searches the table using the input file name with the full path, and retrieves information about the storage area of the input file name in the storage device. In this case, the input file name as viewed by a user or program has no difference from a typical file system having a hierarchical structure and therefore an external multi-layered structure can be maintained, and, because all file names which exist in one directory are managed in one table, an internally flat file management can be made.

Patent Literature 2 discloses that there are included an entry management means that modifies a table to manage the ancestral relationship of entries at the time registering, deleting, or updating ID of an entry existing in a directory hierarchy, a filtering search means that searches for an entry by attribute conditions, and a scope determination means that performs a limited-scope search using the table of the ancestral relationship of entries, and, at the time of directory search, the filtering search means acquires entries that satisfy the attribute conditions, and the scope determination means narrows down the entries to the entry that satisfies the scope conditions.

Patent Literature 3 discloses that, in a processor, an index generation unit generates an index indicating file management information of a file to be read from a file name representing the file to be read by using a function in which a file name and an index are in one-to-one correspondence, and an index file management information associating unit reads the file management information corresponding to the index generated by the index generation unit from a file management information array in which file management information are arranged in order of index and obtains a storage area in a storage device related to the file to be read which is designated by the file management information.

CITATION LIST

Patent Literature

PTL 1: Japanese Unexamined Patent Application Publication No. 10-74154
PTL 2: Japanese Unexamined Patent Application Publication No. 2000-242538
PTL 3: Japanese Unexamined Patent Application Publication No. 2004-185214

SUMMARY OF INVENTION

Technical Problem

In the invention disclosed in Patent Literatures 1 to 3, it is necessary to record a table, index and the like and search them, such as searching a table using an input file name with a full path when an input file name has a full path and retrieving information about the storage area of the input file name in the storage device, thus requiring a large storage capacity and search time.

One way to address the above problem is to determine a path using MD5 (Message Digest Algorithm 5), which is a hash function that outputs a 128-bit hash value in response to a given input. However, because a complicated calculation is required for the computation of MD5, load on a CPU (Central Processing Unit) is heavy and it takes a long time. Further, MD5 is originally developed for digital signature, and it is overdesigned for generation of a value of four digits or so to designate a folder, and such a strict algorithm is not needed.

The present invention has been accomplished to solve the above problem, and an object of the present invention is thus to calculate a path for recording without unevenness promptly with a simple calculation, without need for a table or index.

Solution to Problem

An information processing method according to one aspect of the present invention is an information processing method that manages a directory to store recording information, which is configured to include an identifier acquisition step of acquiring an identifier for identifying the recording information from URL address information, a numerical value calculation step of calculating a numerical value of a plurality of digits as a representative of the identifier from the identifier, and a determination step of computing values computed using an integer determined by the numerical value and a number in a digit place of the numerical value with each other and determining the directory to store the recording information based on a computation result. Note that the number mentioned here includes a number denoted by alphabets in addition to 0 to 9 (for example, A to F in hexadecimal representation).

The numerical value calculation step may calculate the numerical value using a hash function that is not a perfect hash function. Further, the determination step may use a different integer selected from a predetermined set of integers using the numerical value for computation with the number in a digit place of the numerical value. Furthermore, the information processing method may further include a creation step of creating the directory when the directory determined in the determination step does not exist.

An information processing device according to one aspect of the present invention is an information processing device that manages a directory to store recording information, which is configured to include an identifier acquisition unit that acquires an identifier for identifying the recording information from URL address information, a numerical value calculation unit that calculates a numerical value of a plurality of digits as a representative of the identifier from the identifier, and a determination unit that computes values computed using an integer determined by the numerical value and a number in a digit place of the numerical value with each other and determining the directory to store the recording information based on a computation result.

A program according to one aspect of the present invention is a program that manages a directory to store recording information, which is configured to cause a computer to execute an identifier acquisition step of acquiring an identifier for identifying the recording information from URL address information, a numerical value calculation step of calculating a numerical value of a plurality of digits as a representative of the identifier from the identifier, and a determination step of computing values computed using an integer determined by the numerical value and a number in a digit place of the numerical value with each other and determining the directory to store the recording information based on a computation result.

A recording medium according to one aspect of the present invention is configured as a computer-readable recording medium on which a program that manages a directory to store recording information is recorded, the program causing a computer to execute an identifier acquisition step of acquiring an identifier for identifying the recording information from URL address information, a numerical value calculation step of calculating a numerical value of a plurality of digits as a representative of the identifier from the identifier, and a determination step of computing values computed using an integer determined by the numerical value and a number in a digit place of the numerical value with each other and determining the directory to store the recording information based on a computation result.

According to one aspect of the present invention, an identifier for identifying recording information is acquired from URL address information, a numerical value of a plurality of digits as a representative of the identifier is calculated from the identifier, and values computed using an integer determined by the numerical value and a number in a digit place of the numerical value are further computed with each other, and the directory to store the recording information is determined based on a computation result.

Advantageous Effects of Invention

According to one aspect of the present invention, because it is possible to determine a directory from URL address information, it is possible to calculate a path for recording without unevenness promptly with a simple calculation, without need for a table or index. Further, it is possible to uniquely obtain a directory from a URL and store a file in a distributed fashion over directories regardless of the unevenness of a numerical value of a plurality of digits as a representative of an identifier.

BRIEF DESCRIPTION OF DRAWINGS

FIG. 10 is a diagram showing a computation time and the maximum number of files recorded in a directory.

DESCRIPTION OF EMBODIMENTS

Next, embodiments of the present invention will be described. The relationship between elements of the invention and embodiments described in the specification is as follows, for example. This description is merely intended to denote that the embodiments that support the invention are described in this specification. Thus, even if there are embodiments that are described in this specification but not described in this description as embodiments corresponding to the elements of the invention, it does not imply that the embodiments do not correspond to the elements of the invention. Conversely, even if embodiments are described in this description as those corresponding to the elements of the invention, it does not imply that the embodiments do not correspond to elements other than the elements of the invention.

A program according to one aspect of the present invention causes a computer to execute a process including an identification information acquisition step (for example, processing of Step S31 in FIG. 7) of acquiring identification information for identifying recording information to be recorded or read, a prime number acquisition step (for example, processing of Steps S33 and S34 in FIG. 7) of acquiring a prime number corresponding to the identification information among prime numbers having the same number of digits (for example, three digits), a computation step (for example, processing of Steps S38 to S42 in FIG. 7) of computing the total sum of products obtained by multiplying a value of each digit of the identification information by a difference obtained by subtracting a difference in accordance with the digit (for example, the number of digits from the top−1) from the acquired prime number, which is the total sum for all digits of the identification information, and a determination step (for example, processing of Steps S43 to S48 in FIG. 8) of determining a path indicating a directory where the recording information is stored from the total sum.

The program may cause a computer to execute a process further including a creation step (for example, processing of Step S14 in FIG. 6) of, when a directory indicated by the determined path does not exist, creating the directory indicated by the path.

Figure 3:
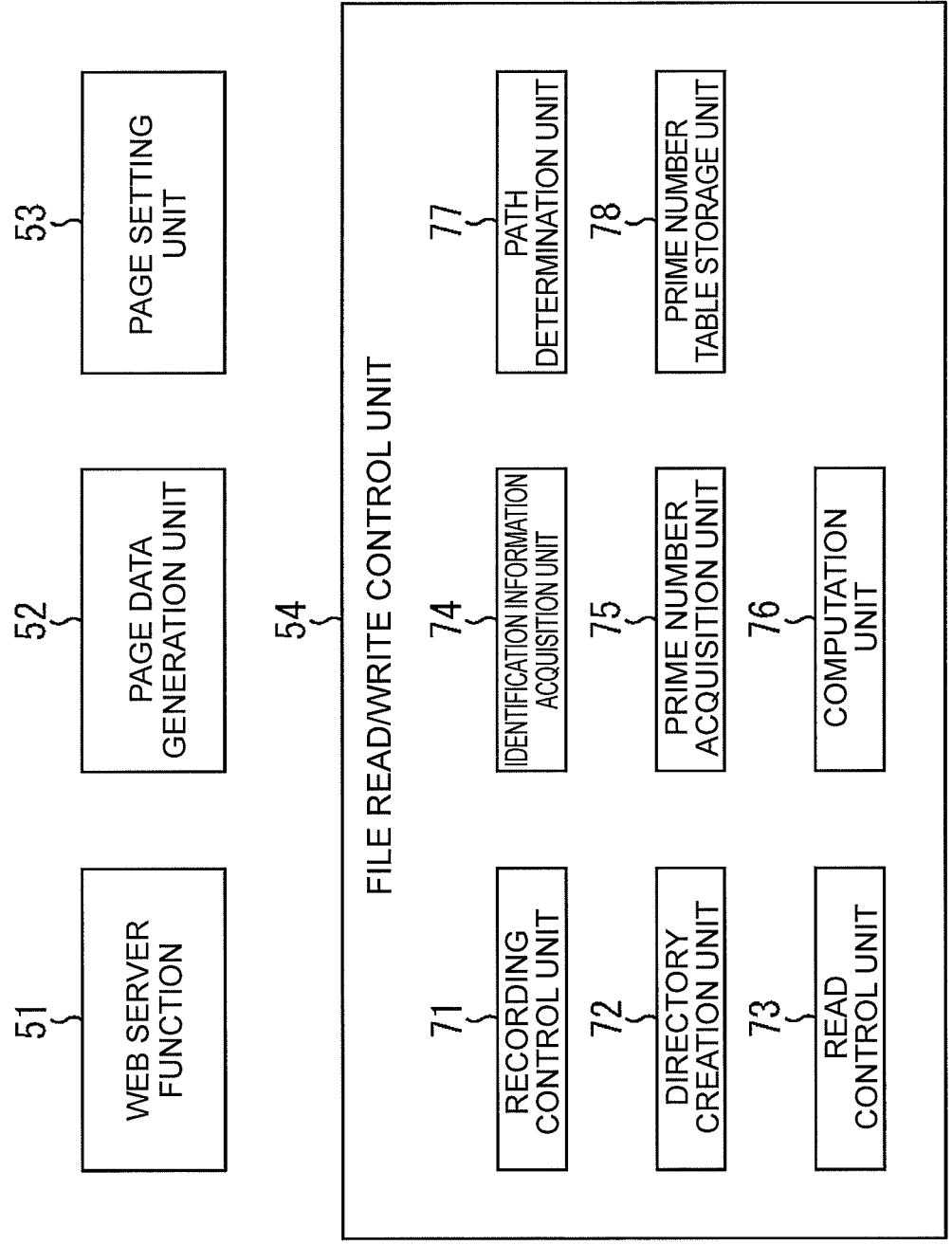
FIG. 3 is a block diagram showing an example of a configuration of functions implemented by the web server 11 that runs a program.

An information processing device according to one aspect of the present invention includes an identification information acquisition means (for example, an identification information acquisition unit 74 in FIG. 3) that acquires identification information for identifying recording information to be recorded or read, a prime number acquisition means (for example, a prime number acquisition unit 75 in FIG. 3) that acquires a prime number corresponding to the identification information among prime numbers having the same number of digits (for example, three digits), a computation unit (for example, a computation unit 76 in FIG. 3) that computes the total sum of products obtained by multiplying a value of each digit of the identification information by a difference obtained by subtracting a difference in accordance with the digit (for example, the number of digits from the top−1) from the acquired prime number, which is the total sum for all digits of the identification information, and a determination means (for example, a path determination unit 77 in FIG. 3) that determines a path indicating a directory where the recording information is stored from the total sum.

An information processing method according to one aspect of the present invention includes an identification information acquisition step (for example, processing of Step S31 in FIG. 7) of acquiring identification information for identifying recording information to be recorded or read, a prime number acquisition step (for example, processing of Steps S33 and S34 in FIG. 7) of acquiring a prime number corresponding to the identification information among prime numbers having the same number of digits (for example, three digits), a computation step (for example, processing of Steps S38 to S42 in FIG. 7) of computing the total sum of products obtained by multiplying a value of each digit of the identification information by a difference obtained by subtracting a difference in accordance with the digit (for example, the number of digits from the top−1) from the acquired prime number, which is the total sum for all digits of the identification information, and a determination step (for example, processing of Steps S43 to S48 in FIG. 8) of determining a path indicating a directory where the recording information is stored from the total sum.

Figure 1:
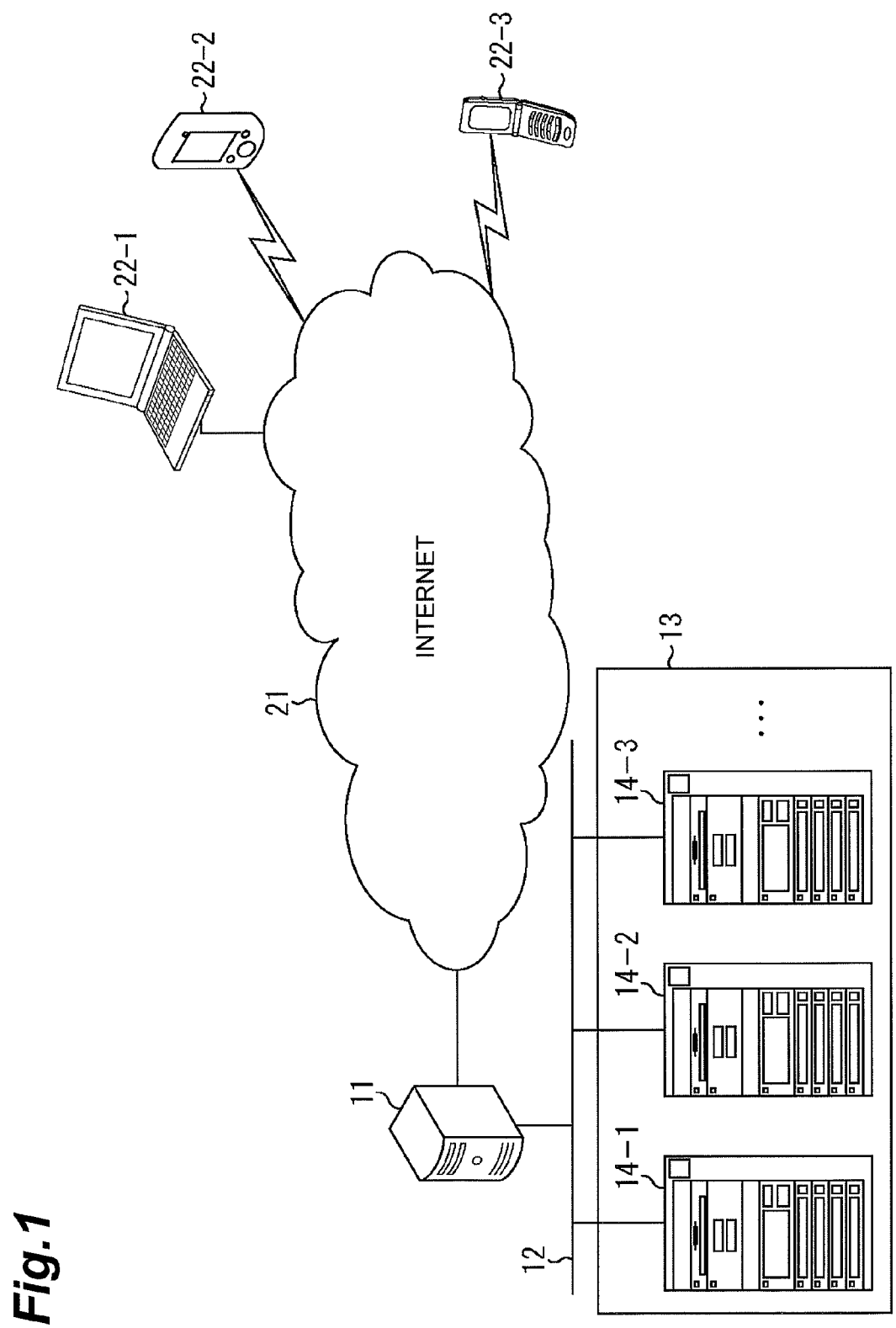
FIG. 1 is a diagram showing an example of a configuration of an information providing system according to one embodiment of the present invention.

FIG. 1 is a diagram showing an example of a configuration of an information providing system according to one embodiment of the present invention. The information providing system is composed of a web server 11, a network 12, and a server group 13, and provides web page data to each of clients 22-1 to 22-3 through the Internet 21.

In response to a request from the clients 22-1 to 22-3, the web server 11 transmits web page data to the client from which the request is made through the Internet 21. For example, the web server 11 transmits web page data for electronic commerce for selling items or the like to the clients 22-1 to 22-3 through the Internet 21.

At this time, the web server 11 reads various kinds of data stored as a file from the server group 13 that provides one storage area through the network 12. Further, the web server 11 stores various data as a file into the server group 13 through the network 12.

When recording a file into the server group 13 or reading a file from the server group 13, the web server 11 determines a path indicating a directory where the file is stored. The network 12 is a so-called internal network, which is a wide band network such as 10 gigabit Ethernet (registered trademark). The network 12 establishes a connection between the web server 11 and the server group 13.

The server group 13 is made up of an NFS server 14-1 to an NFS server 14-N (N is a positive integer). The respective storage areas of the NFS servers 14-1 to 14-N are mounted as one storage area and configured so that data can be stored and read as one storage area. In other words, the web server 11 can handle the storage area of the server group 13 made up of the NFS servers 14-1 to 14-N virtually as if it is its own storage area.

Figure 2:
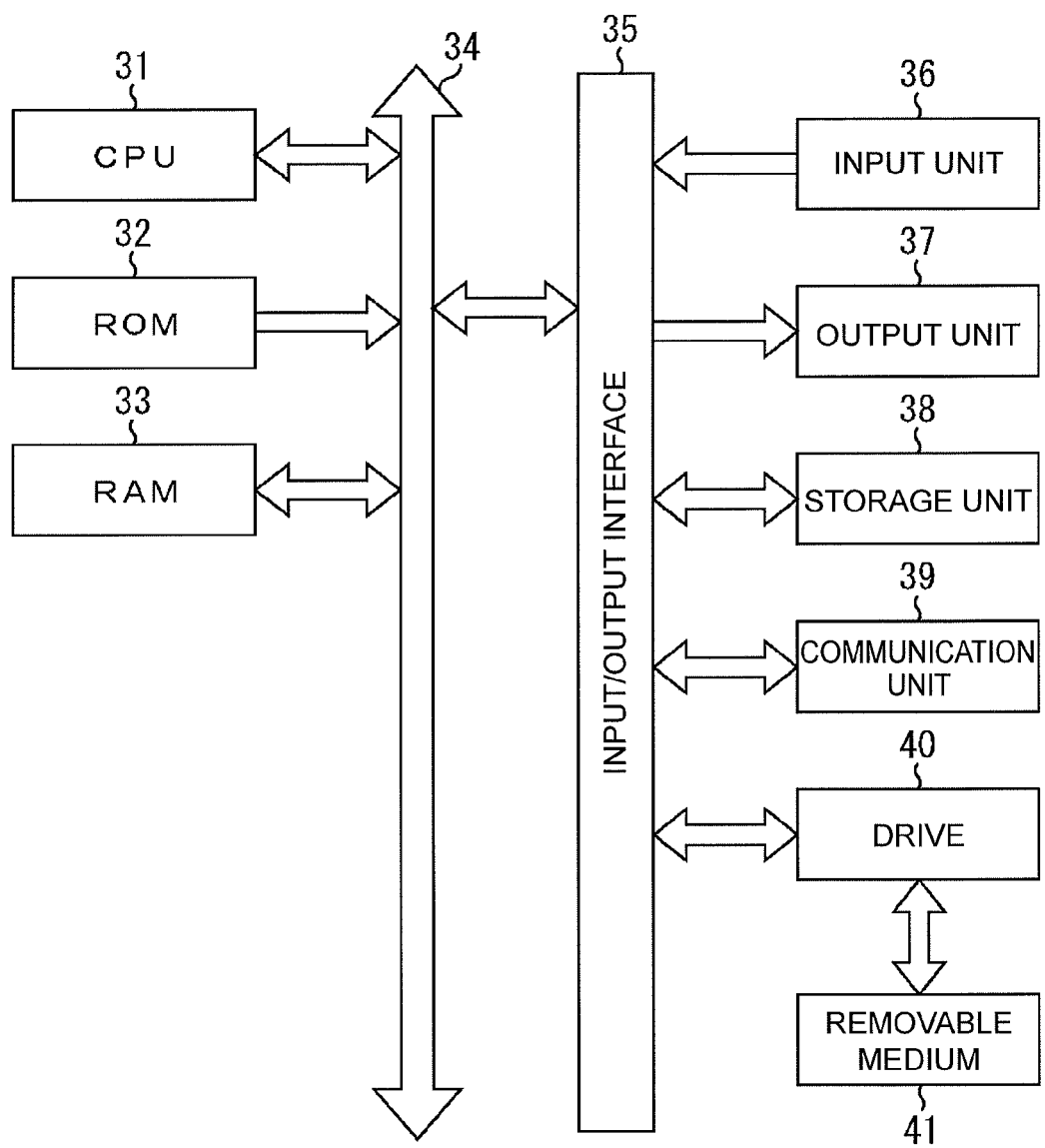
FIG. 2 is a block diagram showing an example of a hardware configuration of a web server 11.

FIG. 2 is a block diagram showing an example of a hardware configuration of the web server 11.

In the web server 11, a CPU (Central Processing Unit) 31, a ROM (Read Only Memory) 32 and a RAM (Random Access Memory) 33 are connected one another through a bus 34.

An input/output interface 35 is further connected to the bus 34. To the input/output interface 35, an input unit 36 such as a keyboard, mouse or microphone, an output unit 37 such as a display or speaker, a storage unit 38 such as a hard disk or nonvolatile memory, a communication unit 39 such as a network interface, and a drive 40 that drives a removable medium 41 such as a magnetic disk, optical disk, magneto-optical disk or semiconductor memory are connected.

In the web server 11 (computer) having the above configuration, the CPU 31 loads a program stored in the storage unit 38 to the RAM 33 through the input/output interface 35 and the bus 34 and executes the program, so that a series of processes described later are performed.

The program that is run by the server 11 (CPU 31) is provided by being recorded in the removable medium 41 which is a package medium like a magnetic disk (including flexible disk), optical disk (CD-ROM (Compact Disc-Read Only Memory) or DVD (Digital Versatile Disc)), magneto-optical disk or semiconductor memory, or provided through a wired or wireless transmission medium such as a local area network, the Internet 21, the network 12, or digital satellite broadcasting.

The program may be installed to a computer by, with the removable medium 41 attached to the drive 41, being stored into the storage unit 38 through the input/output interface 35. Further, the program may be installed to a computer by being received by the communication unit 39 through a wired or wireless transmission medium and stored into the storage medium 38. Furthermore, the program may be pre-installed to a computer by being prestored in the ROM 32 or the storage unit 38.

FIG. 3 is a block diagram showing an example of a configuration of functions implemented by the web server 11 that runs a program. Specifically, the web server 11 runs a program and thereby a web server function 51, a page data generation unit 52, a page setting unit 53, and a file read/write control unit 54 are implemented.

The web server function 51 is implemented by running a so-called web server program such as Apache HTTP Server, for example, and provides web page data in HTML (Hypertext Markup Language) format or XML (Extensible Markup Language) format that contains various objects including text and image on the basis of the procedure specified in HTTP (Hypertext Transfer Protocol).

The page data generation unit 52 generates the web page data that is provided by the web server function 51. The page setting unit 53 sets various data such as images and text to be laid out on a web page to be provided to each of the clients 22-1 to 22-3.

The file read/write control unit 54 stores various data such as images and text to be laid out on a web page as a file into the server group 13 through the network 12 in response to a request from the page setting unit 53. Further, when providing a web page to each of the clients 22-1 to 22-3, the file read/write control unit 54 reads various data such as images and text to be laid out on a web page from the server group 13 through the network 12 in response to a request from the page data generation unit 52.

When recording a file into the server group 13 or reading a file from the server group 13 through the network 12, the file read/write control unit 54 determines a path indicating a directory and a file name where the file is recorded. The directory indicated by the path is a unit of recording that represents the storage area of the server group 13 by a hierarchical tree structure. One or a plurality of files are stored in each directory.

Figure 4:
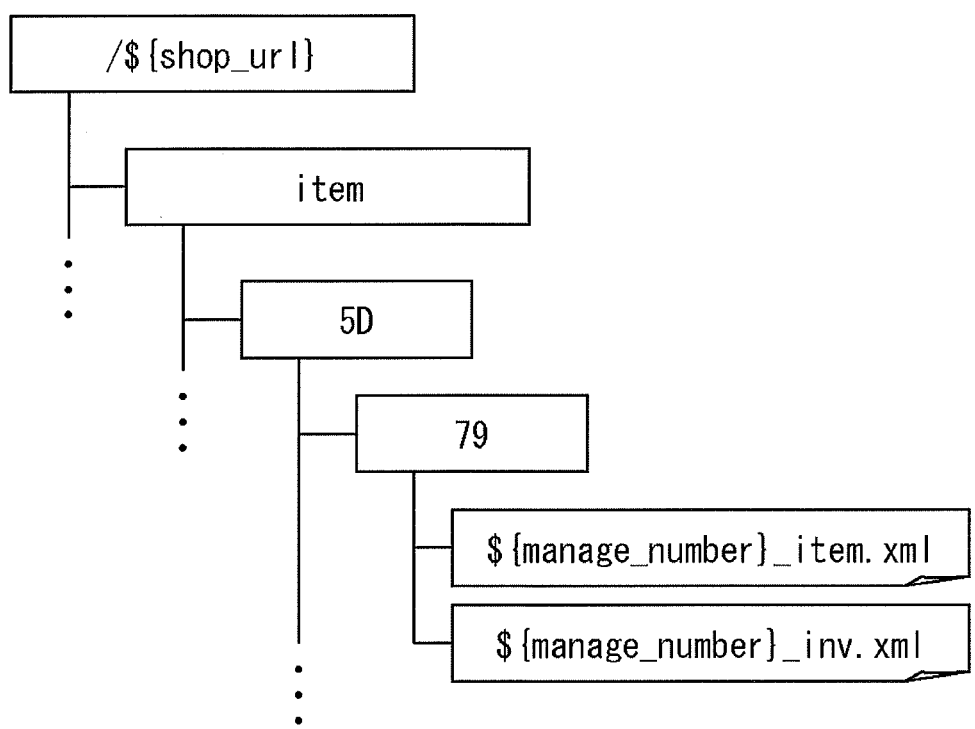
FIG. 4 is a diagram illustrating an example of a path.

FIG. 4 is a diagram illustrating an example of a path in the case of recording data related to an item to appear on an electronic commerce web page as a file. For each address (#{shop_url} in FIG. 4) in URL (Uniform Resource Locator) form of a web page that sells items, item information (#{manage_numbed}_item.xml in FIG. 4) related to an item (item in FIG. 4) that appears on the web page and inventory information (#{manage_number1}_inv.xml in FIG. 4) indicating whether there is inventory of that item are stored in a given directory. At this time, as identification information (identifier) for identifying the item information and inventory information, a path initial value M that indicates a directory to store the item information and inventory information is calculated from an item management number #{manage_numbed} of the item. Further, the path initial value M that indicates a directory to store the item information and inventory information may be calculated from an item management number which is contained in address information in URL form.

When it is assumed that the path initial value M is 5D79 . . . , a path is determined from 5D79, which is the higher-order four digits of the path initial value M. Specifically, as a directory to store the item information and inventory information, a higher order directory, 5D, is determined, and a lower order directory, 79, which is the lower order of the higher order directory 5D, is determined, and then the item information and inventory information are stored into the lower order directory 79, which is the lower order of the higher order directory 5D.

In this case, the file read/write control unit 54 determines a path indicating the higher order directory 5D and the lower order directory 79. Note that, in this case, layout information is stored separately. Although the case of determining a path using the higher-order four digits of the path initial value M is described, a path may be determined using digits more than four digits.

Figure 5:
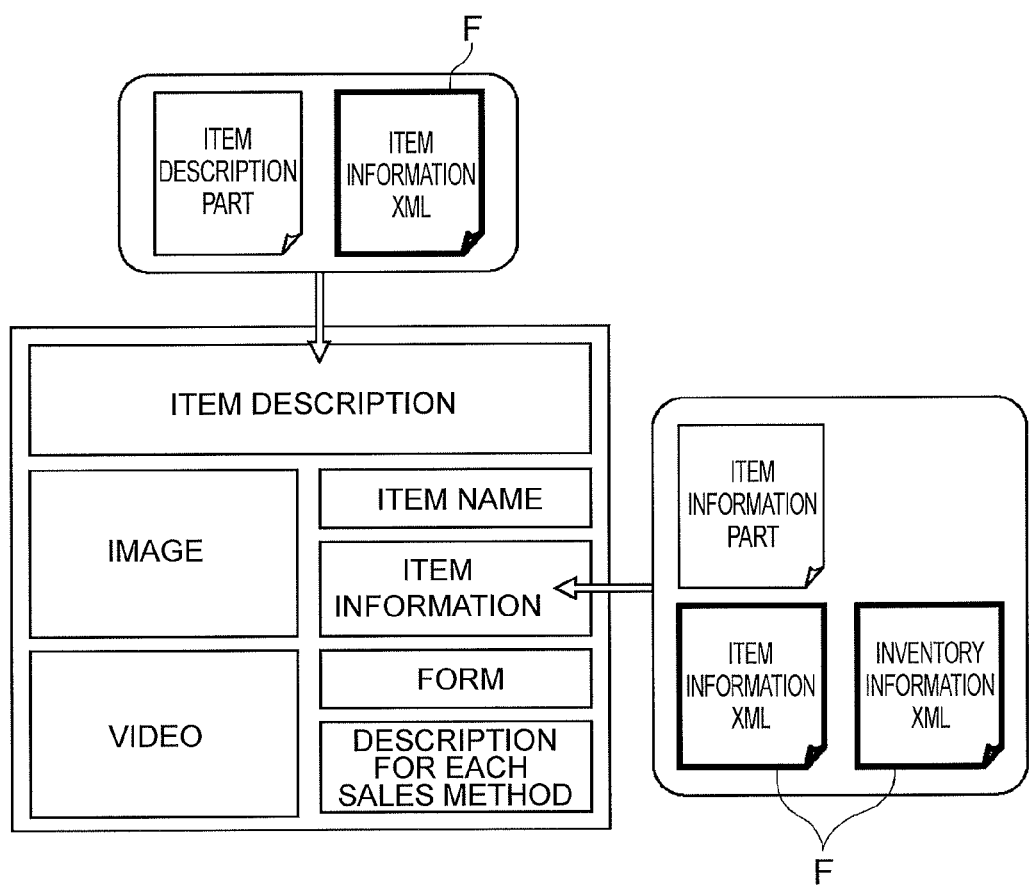
FIG. 5 is a diagram showing an example of data recorded as a file into a server group 13.

FIG. 5 is a diagram showing an example of data related to an item to appear on an electronic commerce web page, which is stored as a file into a server group 13. For example, in the case where description of item, image of item, video of item, name of item, item information, form, and description for each sales method are laid out on an electronic commerce web page, data of the description of item on the web page is generated by the item description part (item description data) and the item information (item information XML in FIG. 5 (#{manage_numbed}_item.xml in FIG. 4)) which is stored as a file F in the server group 13, and data of the item information on the web page is generated by the item description part (item description data), the item information (item information XML in FIG. 5) which is stored as the file F in the server group 13, and the inventory information (inventory information XML in FIG. 5 (#{manage_numbed}_inv.xml in FIG. 4)).

Likewise, the image of item, video of item, name of item, form, and description for each sales method on the web page are generated using the item information (item information XML) which is stored as a file in the server group 13. Further, data of navigation and footer (not shown) on the web page are generated using the item information (item information XML) which is stored as a file in the server group 13.

Referring back to FIG. 3, the file read/write control unit 54 includes a recording control unit 71, a directory creation unit 72, a read control unit 73, an identification information acquisition unit 74 (identifier acquisition unit), a prime number acquisition unit 75, a computation unit 76 (numerical value calculation unit), a path determination unit 77 (determination unit), and a prime number table storage unit 78. The recording control unit 71 controls recording of various kinds of data as a file into the server group 13 through the network 12 on the basis of the protocol of the distributed file system. The directory creation unit 72 creates a directory when there is no directory where a file is to be recorded in the storage area of the server group 13.

The read control unit 73 controls reading of a file from the server group 13 through the network 12 on the basis of the protocol of the distributed file system. The identification information acquisition unit 74 acquires identification information for identifying data (recording information) to be recorded or read as a file. Specifically, in the case of recording or reading data related to an item to appear on an electronic commerce web page as a file, for example, the identification information is an item management number that specifies the item.

The prime number acquisition unit 75 acquires a prime number corresponding to the acquired identification information among prime numbers of the same number of digits that are stored in the prime number table storage unit 78. The computation unit 76 computes the total sum of products obtained by multiplying a value of each digit of the identification information by a difference obtained by subtracting a difference in accordance with the digit from the acquired prime number, which is the total sum for all digits of the identification information. The computation of the total sum by the computation unit 76 is described in detail later.

The path determination unit 77 determines a path indicating a directory where data (recording information) as a file is to be stored from the total sum computed by the computation unit 76. The prime number table storage unit 78 stores a prime number table in which prime numbers of the same number of digits are arranged. Specifically, the prime number table storage unit 78 stores a prime number table in which prime numbers (three-digit prime numbers) in the hundreds place from 101 to 997 are arranged. The prime numbers in the prime number table are arranged in order of magnitude or at random. Note that the number of digits of prime numbers is not limited to three, and it may be any number like two, four, five or six. Further, prime numbers may be arranged in an array or arranged by pointer.

Processes of recording a file and reading a file by the web server 11 are described hereinafter with reference to FIGS. 6 to 9.

First, the file storage process is described. The process of recording a file is performed when the page setting unit 53 requests the file read/write control unit 54 to record item information to be placed on a web page as a file into the server group 13 through the network 12, for example.

Figure 6:
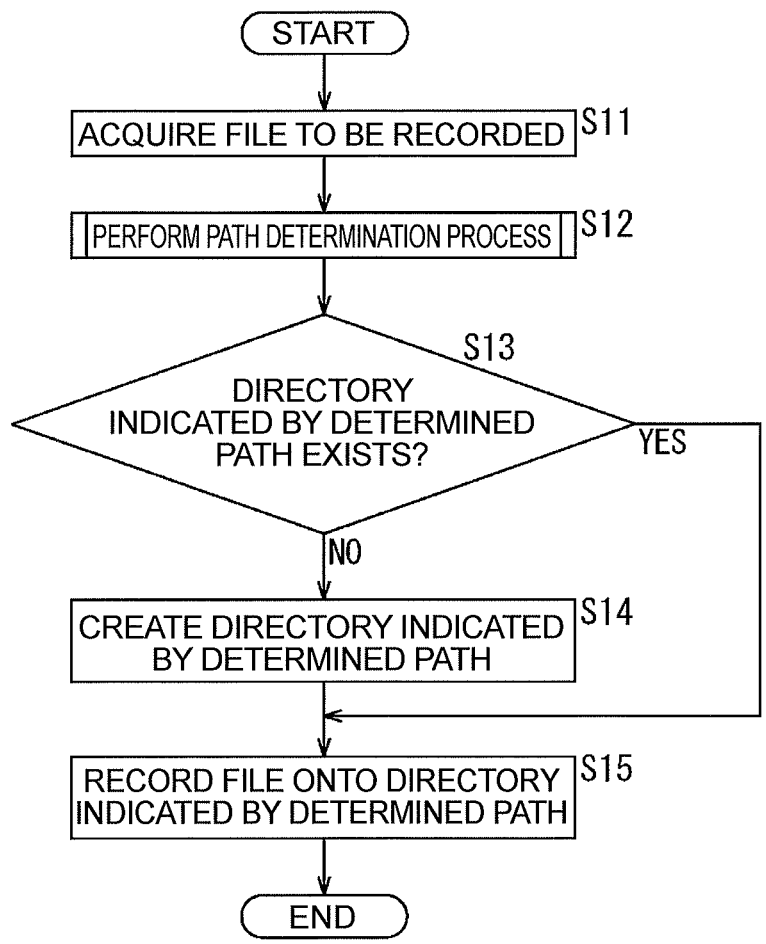
FIG. 6 is a flowchart illustrating a process of recording a file.

FIG. 6 is a flowchart illustrating a process of recording a file. When a request for recording a file of data to be placed on a web page into the server group 13 is made from the page setting unit 53, the file is supplied from the page setting unit 53, and, in Step S11, the file read/write control unit 54 acquires the file to be recorded. In Step S12, the file read/write control unit 54 performs a process of determining a path. The path determination process is described in detail later with reference to the flowcharts of FIGS. 7 and 8.

In Step S13, the recording control unit 71 of the file read/write control unit 54 determines whether there is a directory indicated by the determined path in the server group 13 or not. When it is determined in Step S13 that the directory indicated by the determined path does not exist in the server group 13, the process proceeds to Step S14, and the directory creation unit 72 creates a directory in the server group 13 by giving an instruction to create a directory indicated by the determined path to the server group 13 through the network 12 on the basis of the protocol of the distributed file system. After Step S14, the process proceeds to Step S15.

When, on the other hand, it is determined in Step S13 that the directory indicated by the determined path exists in the server group 13, there is no need to create a directory and therefore the process skips Step S14 and proceeds to Step S15.

In Step S15, the recording control unit 71 records a file onto a directory of the server group 13 which is indicated by the determined path, and the process of recording a file thereby ends.

Figure 7:
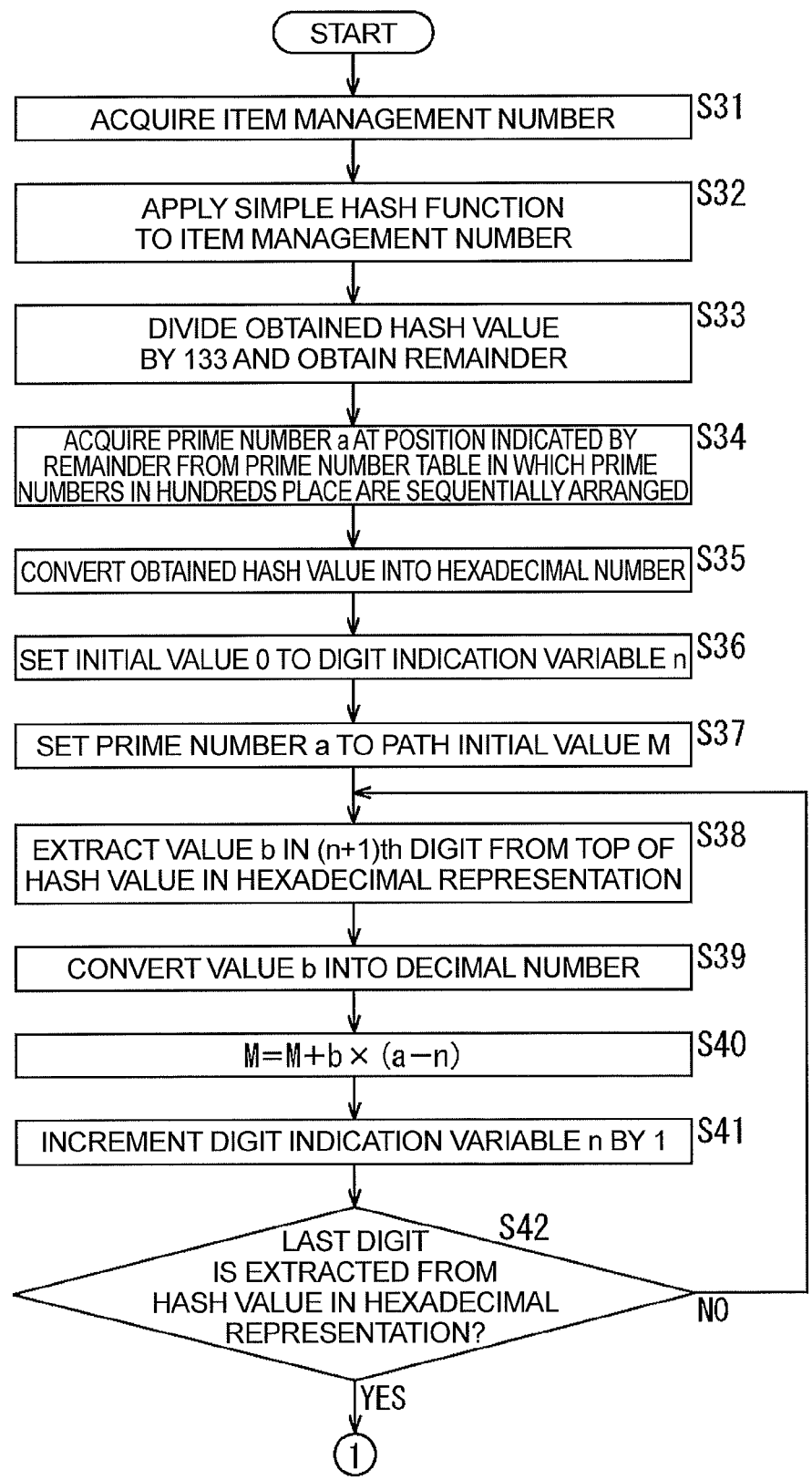
FIG. 7 is a flowchart illustrating details of a process of determining a path.
Figure 8:
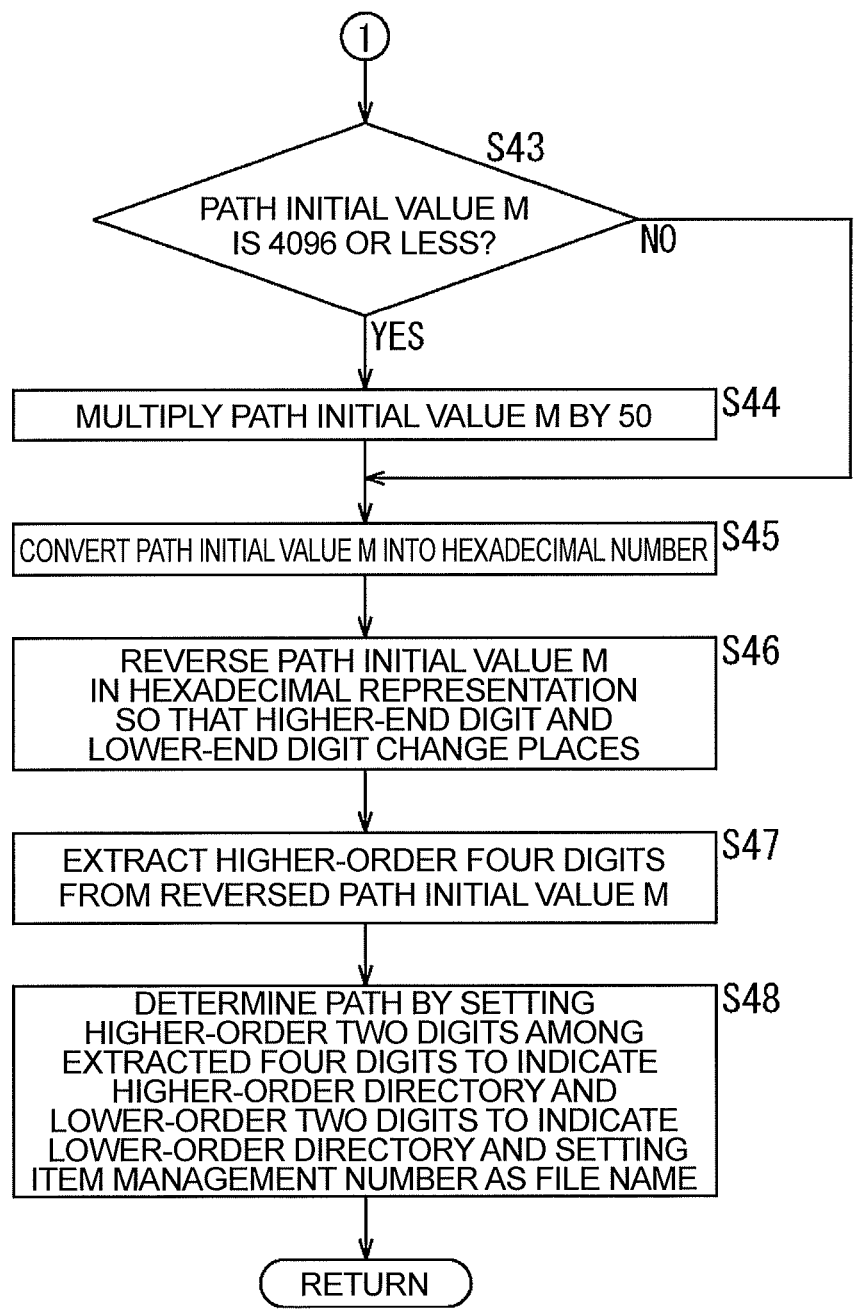
FIG. 8 is a flowchart illustrating details of a process of determining a path.

The path determination process in Step S12 is described hereinafter in detail with reference to the flowcharts of FIGS. 7 and 8. In Step S31, the identification information acquisition unit 74 acquires an item management number, which is an example of the identification information. The item management number is a number that specifies an item indicated by the item information for which a file is recorded. For example, in Step S31, the identification information acquisition unit 74 acquires the item management number ABC-001 by extracting the number from the file supplied from the page setting unit 53. Further, in Step S31, the identification information acquisition unit 74 acquires the item management number ABC-001 which is supplied as a file name from the page setting unit 53, for example. Furthermore, in Step S31, the identification information acquisition unit 74 acquires the item management number ABC-001 by extracting the number from an address in URL form which is supplied from the page setting unit 53, for example. Note that the identification information acquisition unit 74 may acquire the identification information such as the item management number from an internal or external database of the web server 11, such as an item database (not shown) that stores data related to items.

In Step S32, the computation unit 76 applies a simple hash function to the acquired item management number. Note that the computation unit 76 may use a function that generates a numerical value (for example, an integer of a plurality of digits) that serves as a representative of original data (identifier) from the original data, not only a simple hash function. The simple hash function means that it is not a perfect hash function that outputs different hash values for a correct input. Specifically, in Step S32, the computation unit 76 applies a hash function that is contained in the standard C++ library being a programming language to the item management number, for example. More specifically, in Step S32, the computation unit 76 applies a simple hash function to the item management number ABC-001 and thereby obtains a hash value 489014746, for example.

In Step S33, the prime number acquisition unit 75 divides the hash value obtained in Step S32 by 133 and thereby obtains the remainder. The divisor (method) to divide the hash value is a number that is not more than 143 and sufficiently large (for example, 100 or more). 143 is the number of prime numbers (three-digit prime numbers) in the hundreds place from 101 to 997.

For example, in Step S33, the prime number acquisition unit 75 divides the hash value 489014746 by 133 and obtains the remainder, 80.

In Step S34, the prime number acquisition unit 75 acquires a prime number a at the position indicated by the remainder from the prime number table in which the prime numbers in the hundreds place are arranged and which is stored in advance in the prime number table storage unit 78. Specifically, when remainder is 80, the prime number acquisition unit 75 acquires a prime number 631 which is located in the 80th place in the prime number table storage unit 78 as a prime number a from the prime number table storage unit 78.

In Step S35, the computation unit 76 converts the hash value obtained in Step S32 into a hexadecimal number. For example, in Step S35, the computation unit 76 converts the hash value 489014746 into a hexadecimal number, 1d25c5da. As a result of the conversion into hexadecimal digits, the below-described computation can be performed with a reduced number of digits.

In Step S36, the computation unit 76 sets an initial value 0 to a digit indication variable n, which is a variable to indicate a digit. In Step S37, the computation unit 76 sets the prime number a acquired in Step S34 to a path initial value M. The path initial value M is a value to determine a path, which is calculated using the prime number a and the item management number. For example, in Step S37, the computation unit 76 sets the prime number a=631 to the path initial value M.

In Step S38, the computation unit 76 extracts a value b in the (n+1)th digit place from the top of the hash value in hexadecimal representation. For example, in Step S38 that is executed for the first time, because the digit indication variable n is 0, the computation unit 76 extracts the value b=1 which is the top digit of the hash value in hexadecimal representation. Further, in Step S38 that is executed third time by repetition, because the digit indication variable n is 2, the computation unit 76 extracts the value b=2 which is the third digit from the top of the hash value in hexadecimal representation.

In Step S39, the computation unit 76 converts the value b extracted in Step S38 into a decimal number. In Step S40, the computation unit 76 subtracts the digit indication variable n from the prime number a and then multiplies a difference obtained as a result by the value b in decimal representation. The computation unit 76 adds the product obtained as a result of the multiplication to the path initial value M. In other words, in Step S40, the computation unit 76 calculates the value b×(the prime number a−the digit indication variable n) and adds its result to the path initial value M Although the difference in accordance with a digit is the digit indication variable n in this case, the value b×(the prime number a−the digit indication variable n×the constant k) may be calculated using a constant k which is an arbitrary integer (for example, any of −3, −2, −1, 2, 3 and the like).

In Step S41, the computation unit 76 increments the digit indication variable n by one. In Step S42, the computation unit 76 determines whether the last digit is extracted from the hash value in hexadecimal representation. When it determines that the last digit is not extracted, because there remains a digit to be extracted, the process returns to S38 and repeats the above-described processing on the next digit.

As a result of repeating the processing of Steps S38 to S40, the item management number is multiplied by the prime number a one-digit by one-digit, and the prime number a is then subtracted one by one, and the total sum is calculated.

For example, when the prime number a is 631 and the hash value in hexadecimal representation is 1d25c5da, the path initial value M is set to 631 in the processing of Step S37, and 631, which is calculated from 1×631 using the prime number a and the value b=1 at the top digit of the hash value in hexadecimal representation, is added to the path initial value M in the processing of Steps S38 to S40 executed for the first time. Then, in the processing of Steps S38 to S40 executed next, 8190, which is calculated from 13×(631−1) using the prime number a and a value d at the second digit from the top of the hash value in hexadecimal representation, that is value b=13 in decimal representation, is added to the path initial value M.

Likewise, by repeating the processing of Steps S38 to S40, 1258, which is calculated from 2×(631−2) using the prime number a and the value b=2 at the third digit from the top of the hash value in hexadecimal representation, is added to the path initial value M, 3140, which is calculated from 5×(631−3) using the prime number a and the value b=5 at the fourth digit from the top of the hash value in hexadecimal representation, is added to the path initial value M, and 7524, which is calculated from 12×(631−4) using the prime number a and a value c at the fifth digit from the top of the hash value in hexadecimal representation, that is value b=12 in decimal representation, is added to the path initial value M. Further, by repeating the processing of Steps S38 to S40, 3130, which is calculated from 5×(631−5) using the prime number a and the value b=5 at the sixth digit from the top of the hash value in hexadecimal representation, is added to the path initial value M, 8125, which is calculated from 13×(631−6) using the prime number a and a value d at the seventh digit from the top of the hash value in hexadecimal representation, that is value b=13 in decimal representation, is added to the path initial value M, and 6420, which is calculated from 10×(631−7) using the prime number a and a value a at the last digit of the hash value in hexadecimal representation, that is value b=10 in decimal representation, is added to the path initial value M.

As a result of the above computation, the path initial value M=38869 is obtained.

When it is determined in Step S42 that the last digit is extracted, because there remains no digit to be extracted, the process proceeds to Step S43 and the path determination unit 77 determines whether the path initial value M is 4096 or less. When it is determined in Step S43 that the path initial value M is 4096 or less, the process proceeds to Step S44 and the path determination unit 77 multiplies the path initial value M by 50. The reason that the path initial value M is multiplied by 50 when it is 4096 or less is to make the path initial value M have four digits or more when converted into a hexadecimal number. After Step S44, the process proceeds to Step S45.

When it is determined in Step S43 that the path initial value M is not 4096 or less, that is, the path initial value M is more than 4096, the process skips Step S44 and proceeds to Step S45.

In Step S45, the path determination unit 77 converts the path initial value M into a hexadecimal number. For example, in Step S45, the path determination unit 77 converts the path initial value M=38869 into the path initial value M=97D5 in hexadecimal representation. Note that use of a hexadecimal path allows handling of a larger value than a decimal number of the same digit, thus enabling wider distribution of a directory where a file is stored compared to the case of using a decimal path.

In Step S46, the path determination unit 77 reverses the path initial value M in hexadecimal representation so that the higher-end digit and the lower-end digit change places. For example, in Step S46, the path determination unit 77 applies the reverse function to the path initial value M so that the path initial value M is arranged in reverse order. Specifically, in Step S46, the path determination unit 77 reverses the path initial value M=97D5 into M=5D79.

In Step S47, the path determination unit 77 extracts the higher-order four digits from the reversed path initial value M. In Step S48, the path determination unit 77 determines a path by setting the higher-order two digits among the extracted four digits to indicate a higher-order directory and the lower-order two digits to indicate a lower-order directory and setting the item management number as a file name, and the path determination process thereby ends.

For example, in Step S48, the path determination unit 77 sets the higher-order 5D among the path initial value M=5D79 to indicate a higher-order directory and the lower-order 79 to indicate a lower-order directory and further sets the item management number as a file name, and thereby determines "/5D/79/item management number" as a path.

In this manner, it is possible to calculate a path for recording without unevenness promptly and with a simple calculation. Further, it is possible to avoid the situation where a path is too complicated to find into which folder a file should be stored and to make maintenance easier such as the future data transfer.

Reading of a file is described next. For example, in the case where a web page is requested from each of the clients 22-1 to 22-3, when the page data generation unit 52 that generates data of the web page requests the file read/write control unit 54 to read a file from the server group 13 through the network 12, a process of reading a file is performed.

Figure 9:
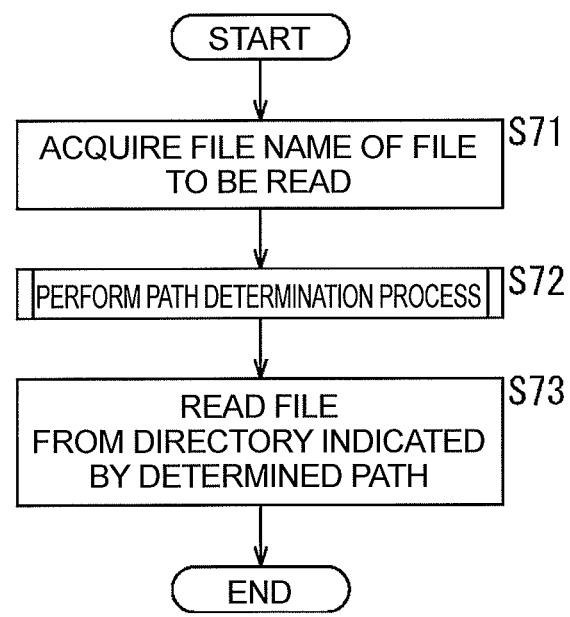
FIG. 9 is a flowchart illustrating a process of reading a file.

FIG. 9 is a flowchart illustrating a process of reading a file. When a request for reading a file from the server group 13 through the network 12 is made from the page data generation unit 52, an address in URL form, an item management number indicating a file name corresponding thereto or the like is supplied from the page data generation unit 52, and, in Step S71, the file read/write control unit 54 acquires the file name of the file to be read. For example, the file read/write control unit 54 may acquire the file name (item management number) from character information contained in the address in URL form of the web page. In Step S72, the file read/write control unit 54 performs a process of determining a path. The path determination process in Step S72 is the same as the process in Step S12 and not redundantly described.

In Step S73, the read control unit 73 of the file read/write control unit 54 reads a file from a directory of the server group 13 which is indicated by the determined path, and the process of reading a file thereby ends.

As described above, a table, index or the like is not needed for reading of a file. Further, at the time of displaying a web page on a user terminal or the like, data can be saved to a file in a hierarchical structure in a simple manner without displaying a hierarchical level at which item information or the like is located in the displayed URL. Further, because there is no need to specify a detailed path in the URL, the displayed URL can be shortened. As a result that the URL is shortened, display, recognition and handling are made easier.

In other words, it is possible to form a multi-level hierarchy using a URL in the state where the URL itself does not have a hierarchy.

For example, in the URL address shown in FIG. 4, it is only necessary to display (http://ooo.☐☐.co.jp/SHOP_URL/ITEM_URL/), and there is no need to generate /◇◇/xx/ in (http://ooo.☐☐.co.hp/SHOP_URL/◇◇/xx/ITEM_URL/) in the information processing method according to this embodiment. In the existing technique, it is necessary to generate /◇◇/xx/ and manage it by making association using a management file such as a database. Further, when making a reference, it is necessary to perform a process in order of acquiring a URL, performing APP processing, referring to a management file, making an inquiry, specifying a directory, and referring to a file. On the other hand, in the technique of this embodiment, it is possible to reach a file only with URL address information by a simpler process of acquiring a URL, performing APP processing, specifying a directory, and referring to a file.

A result of comparison between the existing method using MD5 and the method of this embodiment is described with reference to FIGS. 10 to 12.

FIG. 10 is a diagram showing a computation time taken to determine a path and the maximum number of files recorded in one directory. The computation time shown therein is the average computation time of five-time computations.

First, comparing the case of determining a path from three million item management numbers where three-digit alphameric character and seven-digit numerical value are hyphenated, while the computation time of 15,025 ms was required and the maximum number of files recorded in one directory was 78 in the method described in this embodiment, the computation time of 39,669 ms was required and the maximum number of files recorded in one directory was 83 in the existing method using MD5. Further, comparing the case of determining a path from two million item management numbers where three-digit alphameric character and seven-digit numerical value are hyphenated, while the computation time of 9,809 ms was required and the maximum number of files recorded in one directory was 61 in the method described in this embodiment, the computation time of 26,542 ms was required and the maximum number of files recorded in one directory was 54 in the existing method using MD5.

Furthermore, comparing the case of determining a path from one million item management numbers where three-digit alphameric character and seven-digit numerical value are hyphenated, while the computation time of 5,082 ms was required and the maximum number of files recorded in one directory was 37 in the method described in this embodiment, the computation time of 13,733 ms was required and the maximum number of files recorded in one directory was 34 in the existing method using MD5.

In addition, comparing the case of determining a path from 24,946 item management numbers related to movies, while the computation time of 106 ms was required and the maximum number of files recorded in one directory was 5 in the method described in this embodiment, the computation time of 407 ms was required and the maximum number of files recorded in one directory was 5 in the existing method using MD5. Further, comparing the case of determining a path using ISBNs (International Standard Book Numbers) of 1,565,419 books as item management numbers, while the computation time of 7,575 ms was required and the maximum number of files recorded in one directory was 48 in the method described in this embodiment, the computation time of 19,601 ms was required and the maximum number of files recorded in one directory was 49 in the existing method using MD5.

In this comparison, while the processing time of one item in the method described in this embodiment was 0.005 ms, the processing time of one item in the existing method using MD5 was 0.013 ms.

For reference, comparing the case of determining a path from item management numbers with different number of digits from 1 to 3,000,000, while the maximum number of files recorded in one directory was 83 in the method described in this embodiment, the maximum number of files recorded in one directory was 75 in the existing method using MD5. Further, comparing the case of determining a path from item management numbers with the same number of digits from 0000001 to 3,000,000, while the maximum number of files recorded in one directory was 86 in the method described in this embodiment, the maximum number of files recorded in one directory was 76 in the existing method using MD5.

The above comparison shows that the method described in this embodiment can calculate a path more promptly than the existing method using MD5. It also shows that a number (the prime number a−the digit indication variable n) that differs from digit to digit preferably has at least three digits, and an advantageous effect can be obtained when a directly is created from a numerical value of at least four digits as a path.

Figure 11:
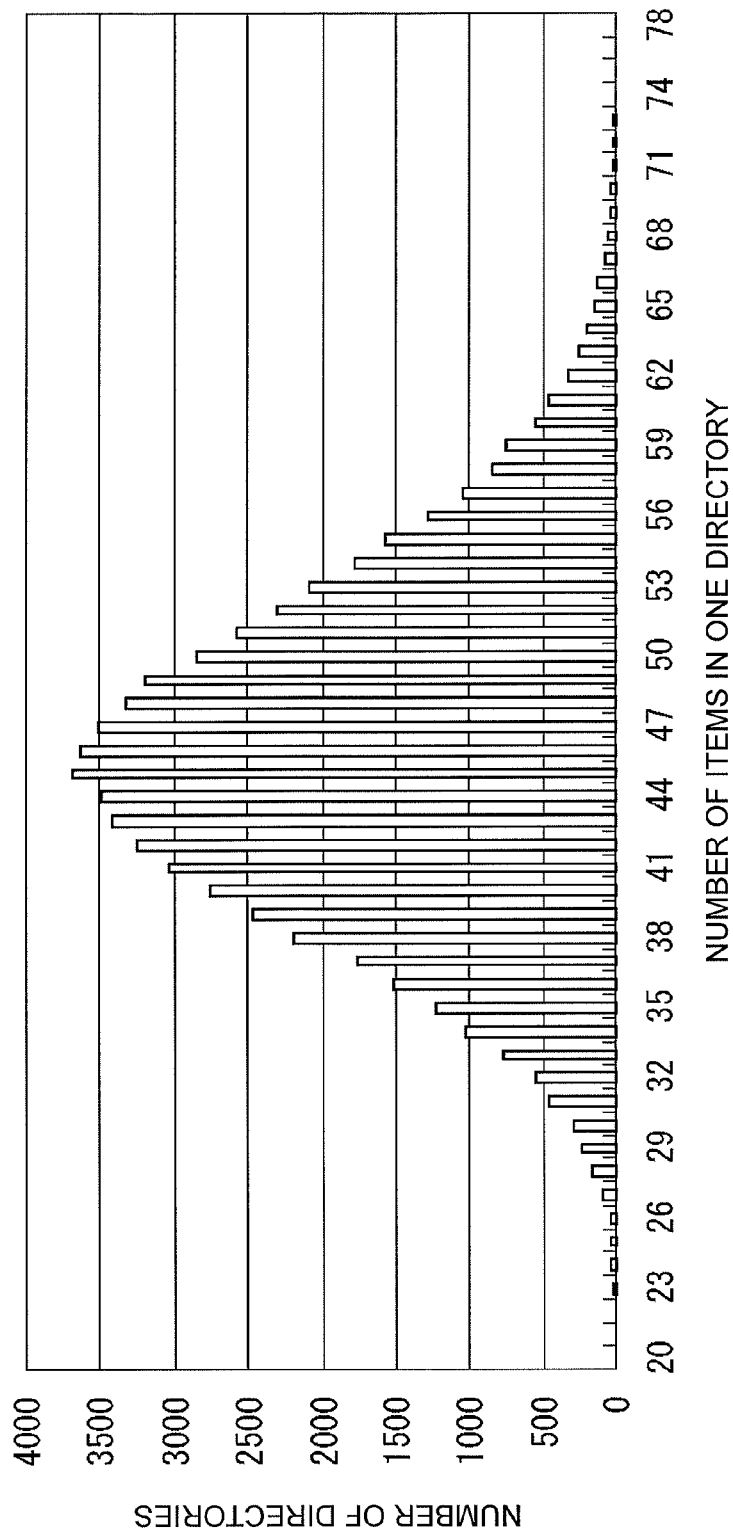
FIG. 11 is a diagram showing a distribution of the number of files recorded in a directory according to this embodiment.

FIG. 11 is a diagram showing a distribution of the number of files recorded in a directory in the case of determining a path from three million random item management numbers where three-digit alphameric character and seven-digit numerical value are hyphenated by the method described in this embodiment. As described with reference to FIG. 10, the computation time was 15,025 ms, and the maximum number of files recorded in one directory was 78.

As shown in FIG. 11, the number of directories in which 45 files are recorded is about 3700, which is the largest, and the relationship between the number of files recorded in one directory and the number of directories that store the given number of files is close to a normal distribution.

Figure 12:
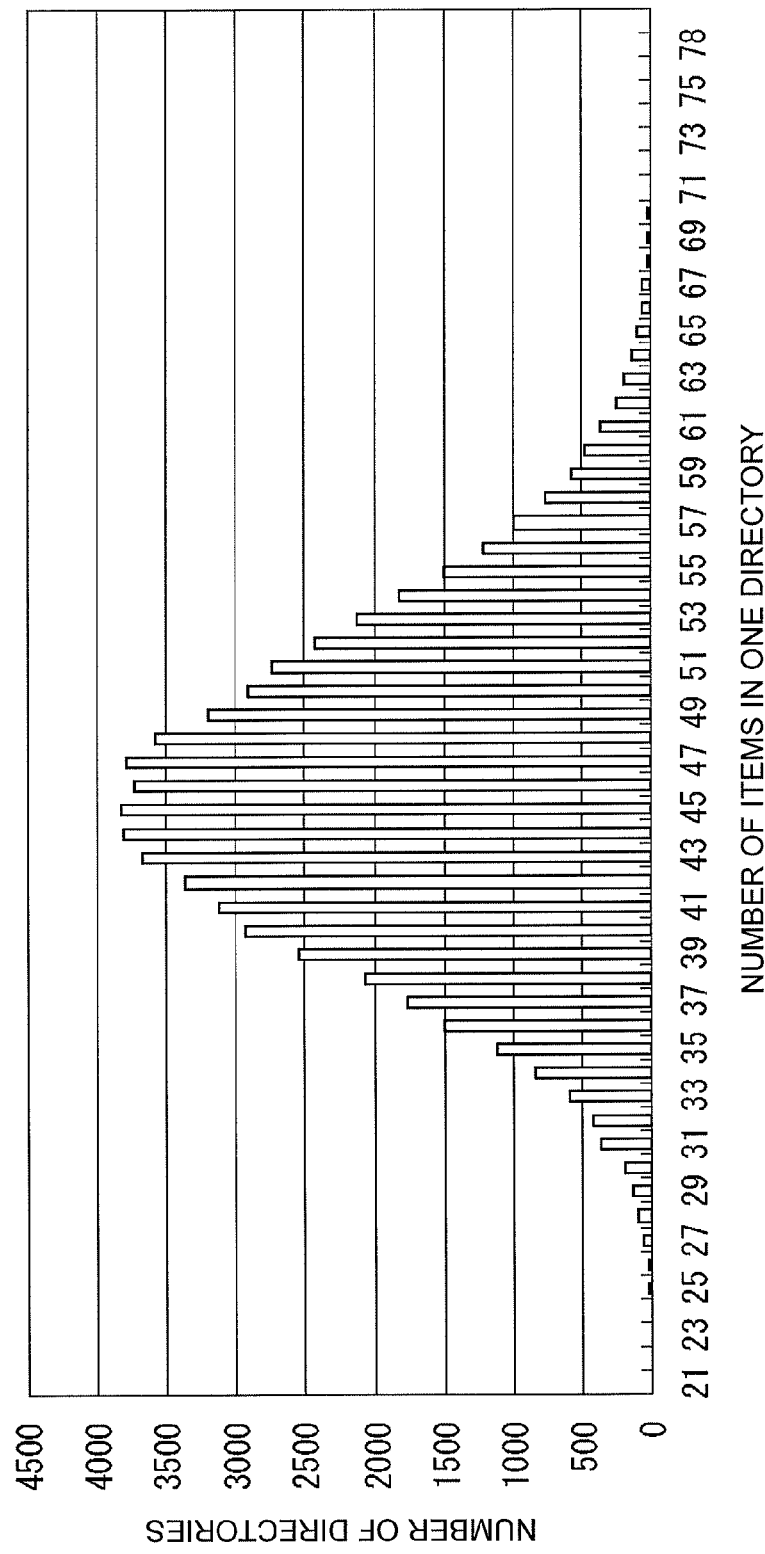
FIG. 12 is a diagram showing a distribution of the number of files recorded in a directory according to related art.

FIG. 12 is a diagram showing a distribution of the number of files recorded in a directory in the case of determining a path from three million random item management numbers where three-digit alphameric character and seven-digit numerical value are hyphenated by the existing method using MD5. As described with reference to FIG. 10, the computation time was 39,669 ms, and the maximum number of files recorded in one directory was 83.

As shown in FIG. 11, the number of directories in which 44, 45 or 47 files are recorded is about 3800, which is the largest, and the relationship between the number of files recorded in one directory and the number of directories that store the given number of files is close to a normal distribution.

Those graphs show that the method described in this embodiment can calculate a path for recording files into directories without unevenness, just like the existing method using MD5. They also show that a number (the prime number a—the digit indication variable n) that differs from digit to digit preferably has at least three digits, and an advantageous effect can be obtained when a directly is created from a numerical value of at least four digits as a path.

Although the case of reading and writing a file in which data related to an item to appear on an electronic commerce web page is stored is described in the above example, the data to be read and read is not limited thereto, and any types of data such as image, voice, text and numeric may be used. In this case, the identification information can be any information as long as it identifies data (recording information), such as a file name, data name, recording date and time, device ID (Identification) that specifies a device like a digital camera, Mac address (Media Access Control address), user ID that specifies a user, latitude and longitude indicating a place of recording, or a combination of those.

Further, although a path indicating a directory having a two-level hierarchy is created in the above example, the path is not limited to the two-level hierarchy, and it may be a single-level hierarchy or three-level hierarchy.

As described above, according to the method of this embodiment, it is possible to calculate a path for recording without unevenness promptly and with a simple calculation.

As described in the foregoing, in the case of acquiring identification information for identifying recording information to be recorded or read, acquiring a prime number corresponding to the identification information among prime numbers of the same number of digits, computing the total sum of products obtained by multiplying a value of each digit of the identification information by a difference obtained by subtracting a difference in accordance with the digit from the acquired prime number, which is the total sum for all digits of the identification information, and determining a path indicating a directory where the recording information is stored from the total sum, it is possible to record the information promptly and without unevenness, without need for a table or index. Thus, it is possible to compute a number in a digit place of a hash value obtained by a simple hash method and a different integer selected using the hash value from a set of integers, compute the computation results with each other, and then determine a directory on the basis of the obtained value. Further, it is possible to uniquely obtain a directory from a URL and store a file in a distributed fashion over directories regardless of the unevenness of the hash value.

The above-described processes may be executed by hardware or software.

It should be noted that the program run by a computer may be a program that is processed in a time sequence according to the order shown in this specification or a program that is processed in parallel or at a necessary timing such as when called.

Embodiments of the present invention are not restricted to the above-described embodiments, and various changes and modifications may be made without departing from the scope of the invention.

For example, although the prime number a is acquired from the prime number table (set) in Step S34 in the above embodiment, it may be acquired by another method. For example, the prime number a may be acquired from a set of discontinuous integers or acquired from a predetermined table.

Further, although the example in which the path determination unit 77 multiplies the path initial value M by 50 to make the path initial value M have four digits or more when converted into a hexadecimal number is described in Step S44 in the above embodiment, this step may be omitted as appropriate.

Furthermore, although the example in which the value b×(the prime number a−the digit indication variable n) is calculated for each digit and added is described in Step S39 in the above embodiment, the value used for multiplication of the value b may be any value as long as it is an integer that differs from digit to digit, and, the digit indication variable n may be added, not only subtracted, to the prime number a, or the value may be calculated not from the prime number a. For example, a different integer may be obtained using a random number. Further, although the example of multiplying the value b by an integer different from digit to digit is described, addition, subtraction or division may be carried out instead of the multiplication.

REFERENCE SIGNS LIST 11 web server, 12 network, 13 server group, 14-1 to 14-N NFS server, 31 CPU, 32 ROM, 33 RAM, 38 storage unit, 39 communication unit, 41 removable medium, 51 web server function, 52 page data generation unit, 53 page setting unit, 54 file read/write control unit, 71 recording control unit, 72 directory creation unit, 73 read control unit, 74 identification information acquisition unit, 75 prime number acquisition unit, 76 computation unit, 77 path determination unit, 78 prime number table storage unit

The invention claimed is:

1. An information processing method that manages a directory to store recording information, comprising:
    acquiring an identifier for identifying the recording information from URL address information;
    calculating a numerical value of a plurality of digits as a representative of the identifier from the identifier; and
    determining the directory to store the recording information by:
    selecting a first integer from a predetermined set of first integers using the numerical value,
    obtaining second integers, each corresponding to a digit of the numerical value using a selecting variable,
    computing a result by performing a mathematical operation between each of the second integers and the first integer; and
    determining the directory to store the recording information based on the computation result,
    wherein the computation result is reversed such that a higher end digit and a lower end digit change places.

2. The information processing method according to claim 1, wherein
    the directory has a higher order directory and a lower order directory, and
    the determining operation determines the higher order directory at a high digit of the computation result and determines the lower order directory at a low digit of the computation result.

3. The information processing method according to claim 1, wherein
    the calculating operation calculates the numerical value using a hash function that is not a perfect hash function.

4. The information processing method according to of claim 1, further comprising:
    creating the directory when the directory determined in the determining operation does not exist.

5. An information processing device that manages a directory to store recording information, comprising:
    an identifier acquisition unit that acquires an identifier for identifying the recording information from URL address information;
    a numerical value calculation unit that calculates a numerical value of a plurality of digits as a representative of the identifier from the identifier; and
    a determination unit, implemented by a processor, configured to:
    select a first integer from a predetermined set of first integers using the numerical value,
    obtain a second integer, each corresponding to a digit of the numerical value using a selecting variable,
    compute a result by performing a mathematical operation between each of the second integers and the first integer; and
    determine the directory to store the recording information based on the computation result,
    wherein the computation result is reversed such that a higher end digit and a lower end digit change places.

6. A non-transitory computer-readable recording medium on which a program that manages a directory to store recording information is recorded, the program causing a computer to execute:
    acquiring, an identifier for identifying the recording information from URL address information;
    calculating a numerical value of a plurality of digits as a representative of the identifier from the identifier; and
    determining the directory to store the recording information by:

selecting a first integer from a predetermined set of first integers using the numerical value, obtaining second integers, each corresponding to a digit of the numerical value using a selecting variable, computing a result by performing a mathematical operation between each of the second integers and the first integer; and determining the directory to store the recording information based on the computation result, wherein the computation result is reversed such that a higher end digit and a lower end digit change places.

7. The information processing method according to claim 1, wherein the first integer is acquired by dividing the numerical value by a predetermined number, and looking at a position in a table storing the plurality of first integers corresponding to a remainder from the division.

8. The information processing method according to claim 1, wherein the computation result is converted into an hexadecimal number.

* * * * *